Oct. 7, 1924.
G. H. RANSOM
WINDSCREEN FOR ROAD VEHICLES
Filed Feb. 7, 1922
1,510,608
2 Sheets-Sheet 2
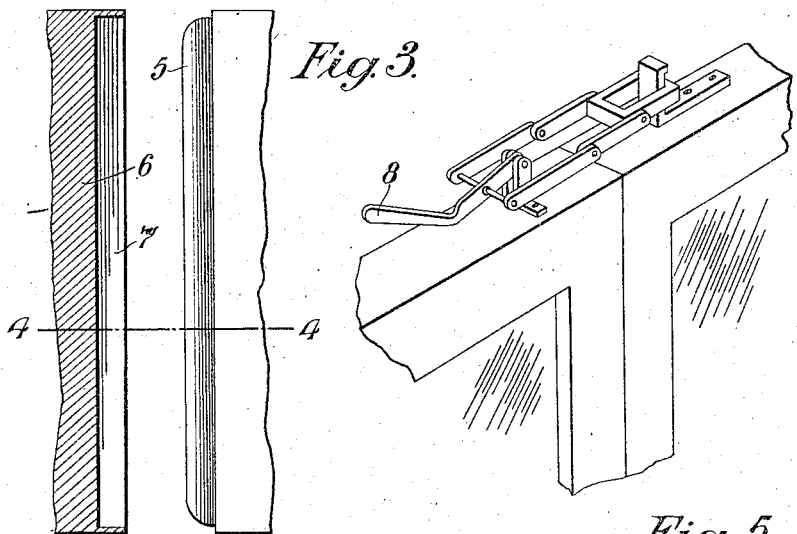
Fig. 3.
Fig. 5.
Fig. 4.
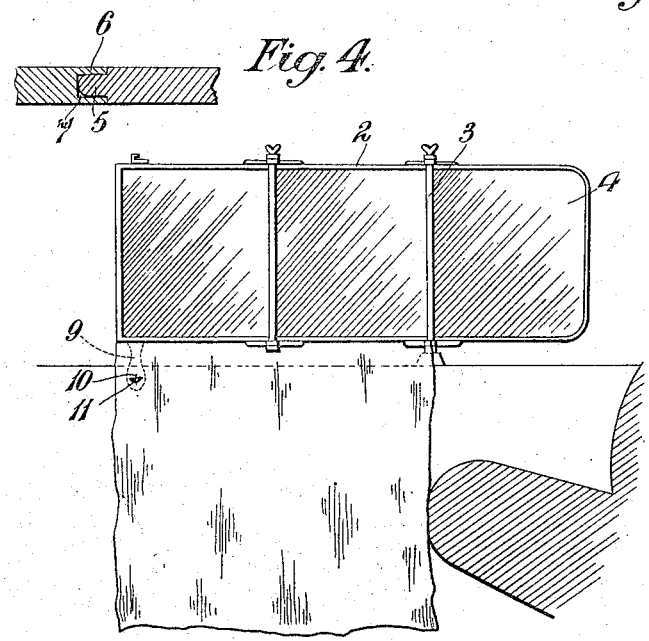
Fig. 6.

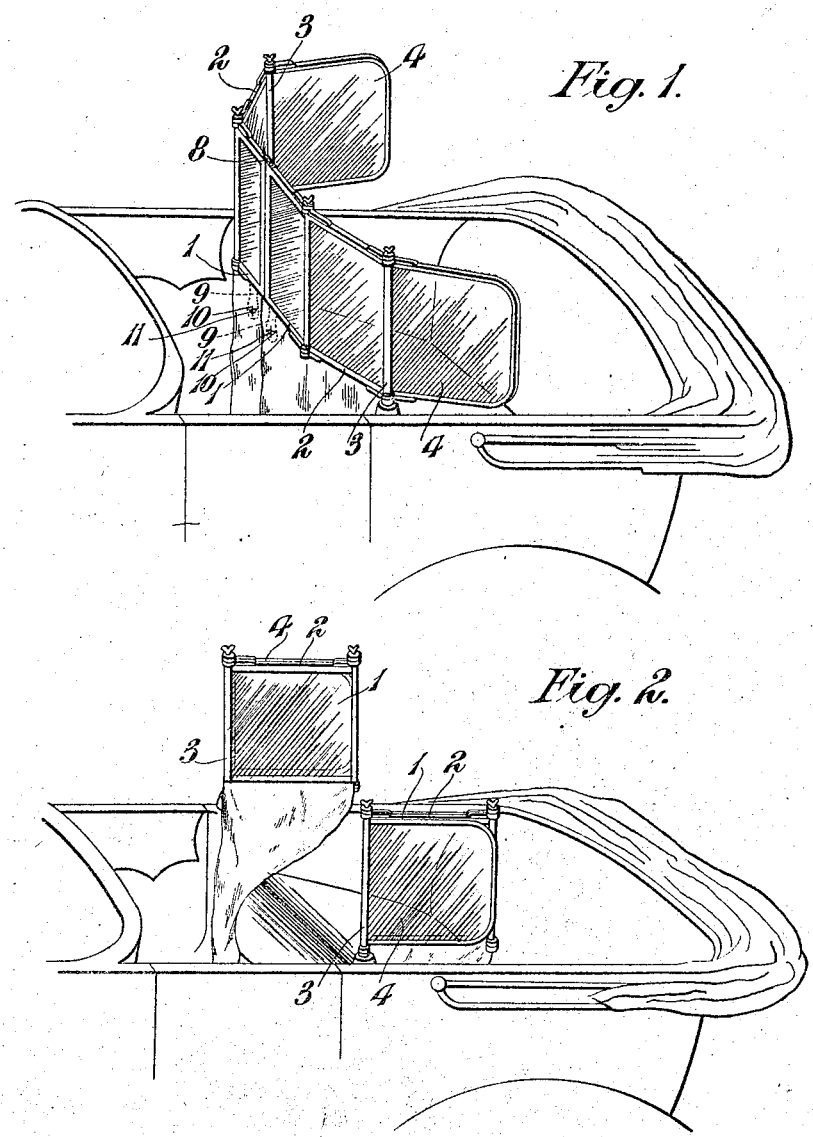

Patented Oct. 7, 1924.

1,510,608

UNITED STATES PATENT OFFICE.

GEORGE HARDIMAN RANSOM, OF BIRMINGHAM, ENGLAND.

WINDSCREEN FOR ROAD VEHICLES.

Application filed February 7, 1922. Serial No. 534,729.

*To all whom it may concern:*

Be it known that I, GEORGE HARDIMAN RANSOM, a subject of the King of Great Britain, and resident of Northfield, Birmingham, Warwickshire, England, have invented certain new and useful Improvements in Windscreens for Road Vehicles, of which the following is a specification.

This invention relates to wind screens for road vehicles and more particularly for the back seats of motor vehicles, and has for its object to provide an improved screen of simple construction that can be readily brought into and out of operative position, and at the same time allow of free ingress and egress of the passengers to and from a seat provided with such a wind screen.

The present invention has reference to wind screens consisting of two independent portions formed of vertically hinged transparent sections hinged to the respective sides of the vehicle and adapted when in use to extend across the vehicle, and consists in hinging the supporting ends of the two portions to the front edges of side screens mounted on the sides of the vehicle and so that the closed sections can be folded against them when not in use.

The pillar or pin of the supporting hinge of the sections is preferably forged on or fixed to the hood supporting irons, and may be removably mounted in sockets secured on the sides of the vehicle or formed in the hood supporting irons; or the supporting members of these hinges may be hinged to the sides of the carriage in such a manner that the folded sections of the screen can be turned down below the level of the top of the sides of the carriage.

Important features of the invention are the provision of rebate strip and groove joints at the meeting edges of the screen panels to exclude the possibility of draught at the centre of the screen, and the provision of means for holding the screen securely in position either when closed up or when extended along the sides of the vehicle to form a side screen.

An embodiment of the invention is illustrated in the accompanying drawings wherein Figs. 1 and 2 are perspective views of the screen in the open and closed positions respectively.

Fig. 3 is an elevational view partly in section illustrating the method of forming the joint at the centre of the screen when the latter is in operative position across the vehicle, Fig. 4 is a section on line 4—4 of Fig. 3 and Fig. 5 is a perspective view illustrating one form of toggle joint for drawing the meeting edges of the screen members together, and Fig. 6 is an elevational view illustrating the means for holding the screen securely against vibration at the sides of the vehicle.

In these drawings 1 and 2 are vertically hinged sections of each portion of the screen. These portions are mounted on hinge pins or pillars 3 secured to the sides of the vehicle or to hood irons secured thereon. The front edges of the side screen sections 4 are also mounted on these hinges or pillars 3, and all the hinges are made on the friction grip principle so that they can be readily fixed to hold the sections in any desired angular relation to one another. Any other suitable devices may however, be used for securing these hinges at the desired angles.

The free edges of the sections 1, meet at the centre of the vehicle where they may be held by suitable fastenings, and these edges abut against each other in such a manner that the whole screen forms a rigid strut across the vehicle.

The sections or panels of the screen are preferably constructed of plate glass or triplex glass mounted in suitable frames as heretofore, and hinged together in such a manner as to enable them to fold against the side screens which may consist of similar transparent panels; and rubber buffers are preferably provided between the frames of the sections to prevent rattling when the sections are folded together.

It will be readily understood that one half of the screen can be used alone and held in using position by tightening the hinges.

In order to ensure a tight joint at the meeting edges of the two screen members one half is provided with a rebate strip 5 and the other half with a corresponding recess 7. When the screen is extended across the vehicle the rebate strip 5 engages in the recess 7 and the two halves of the screen are locked together by means of a toggle fastening 8. The operation of the toggle fastening operates to pull the meeting edges of the two halves of the screen tightly into engagement with each other. When the screen is in this position it forms a rigid strut across the vehicle and when not in use the sections can be folded against the side screens 4. Rigidity is secured by means of a steel or like strip 9 having a slot 10. This strip 9 is secured to the underside of the screen and sewn into the usual apron and security is effected by means of the turn-buttons 11 which are of ordinary form.

These turnbuttons are passed through the slot 10 and then turned at right angles to it as will be readily understood upon reference to the drawings.

What I claim and desire to secure by Letters Patent is:—

1. A wind screen for the rear seats of motor vehicles comprising vertical pivots attached to the sides of the vehicle, side screens mounted to swing about said pivots, panels also mounted to swing about said pivots independently of the side screens, said panels when in use being adapted to meet at the centre of the vehicle and extend right across the same, interengaging means on the meeting edges of the panels and a fastening device associated with both panels near their meeting edges said fastening device serving to pull the two meeting edges of the panels tightly into engagement with each other and to secure them in such engaged position so that the screen forms a rigid strut across the vehicle.

2. A wind screen for the rear seats of motor vehicles comprising vertical pivots attached to the sides of the vehicle, side screens mounted to swing about said pivots, panels also mounted to swing about said pivots independently of the side screens, said panels when in use being adapted to meet at the centre of the vehicle and extend right across the same, a rebate strip projecting from the meeting edge of one inner panel adapted to fit in a corresponding recess in the meeting edge of the other inner panel, a toggle fastening device associated with both inner panels near their meeting edges said fastening device serving to pull the two meeting edges of the panels tightly into engagement with each other and to secure them in such engaged position so that the screen forms a rigid strut across the vehicle.

In witness whereof I affix my signature.

GEORGE HARDIMAN RANSOM.